April 14, 1931.  M. NELSEN  1,800,898
CONVEYING APPARATUS
Filed June 8, 1928   5 Sheets-Sheet 1
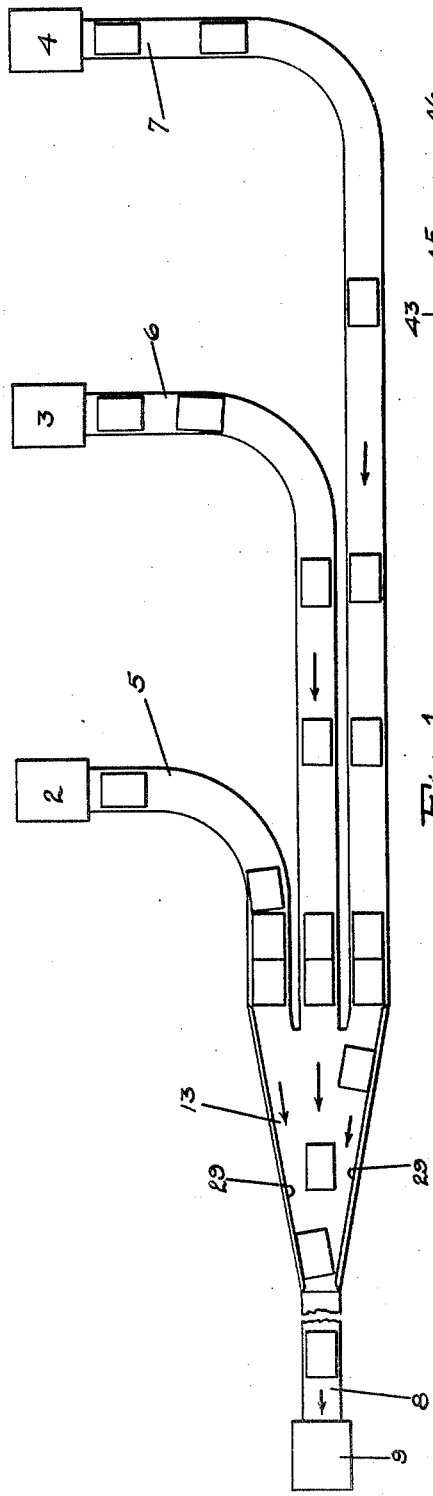
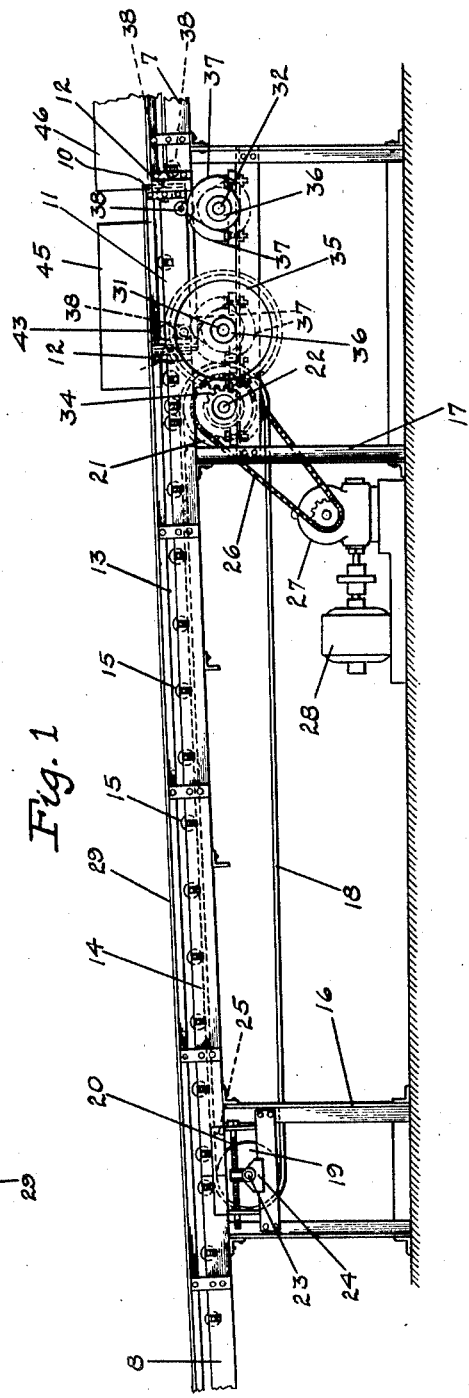
Inventor
MONBERG NELSEN
By Paul Paul Kirkland
Attorneys

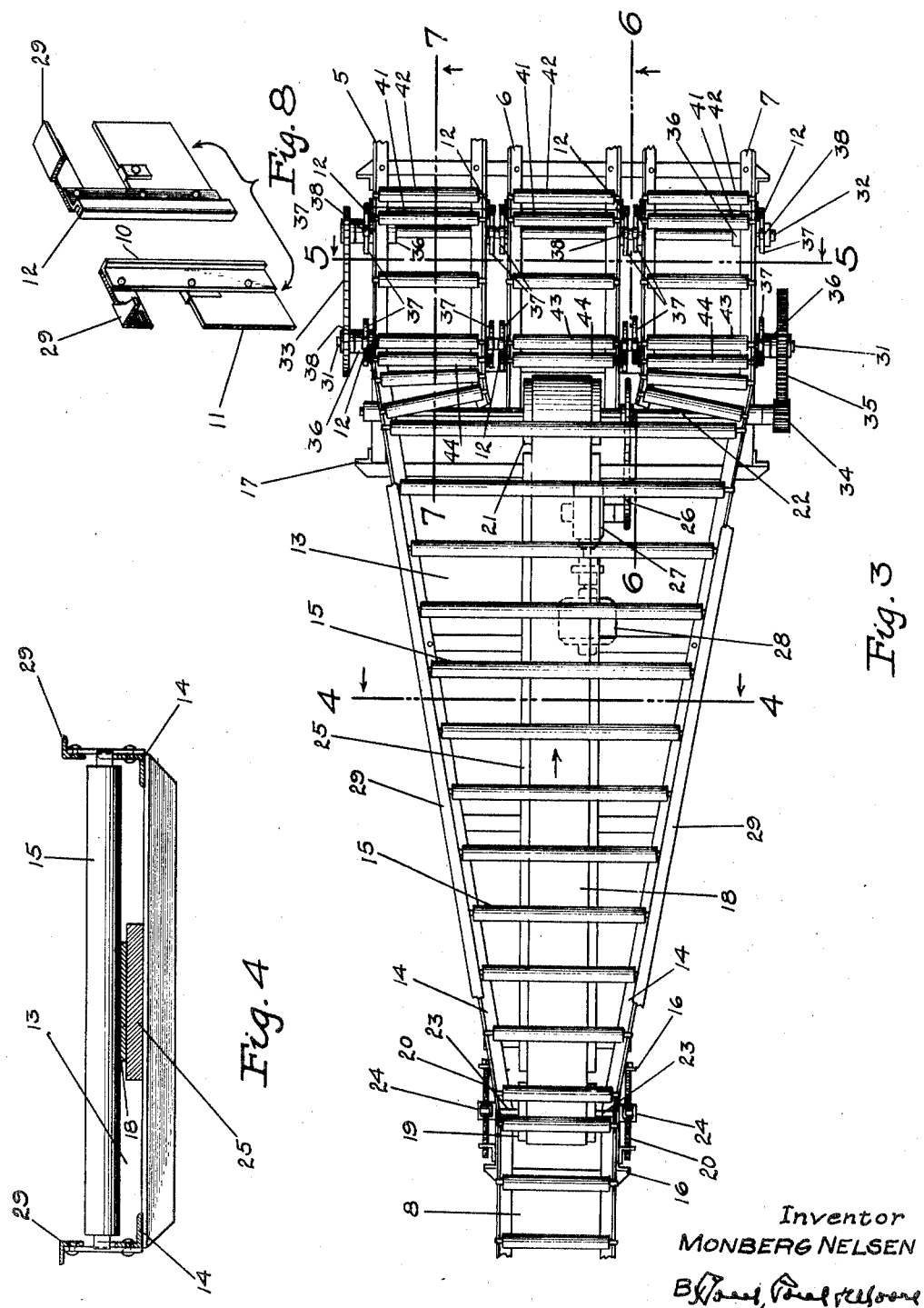

April 14, 1931.　　　　M. NELSEN　　　　1,800,898
CONVEYING APPARATUS
Filed June 8, 1928　　　5 Sheets-Sheet 3
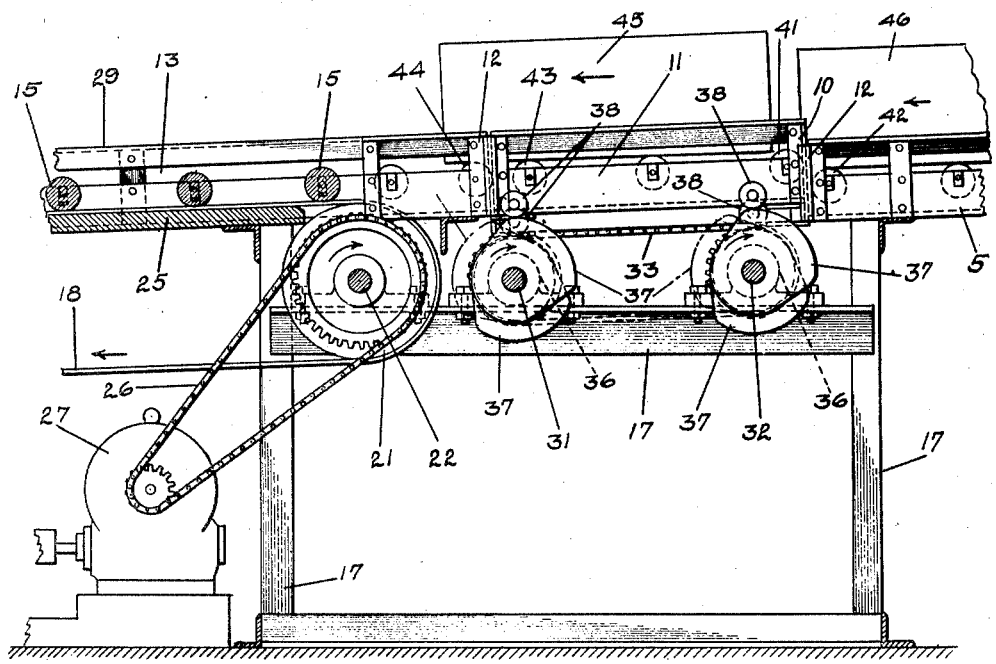
Fig. 6
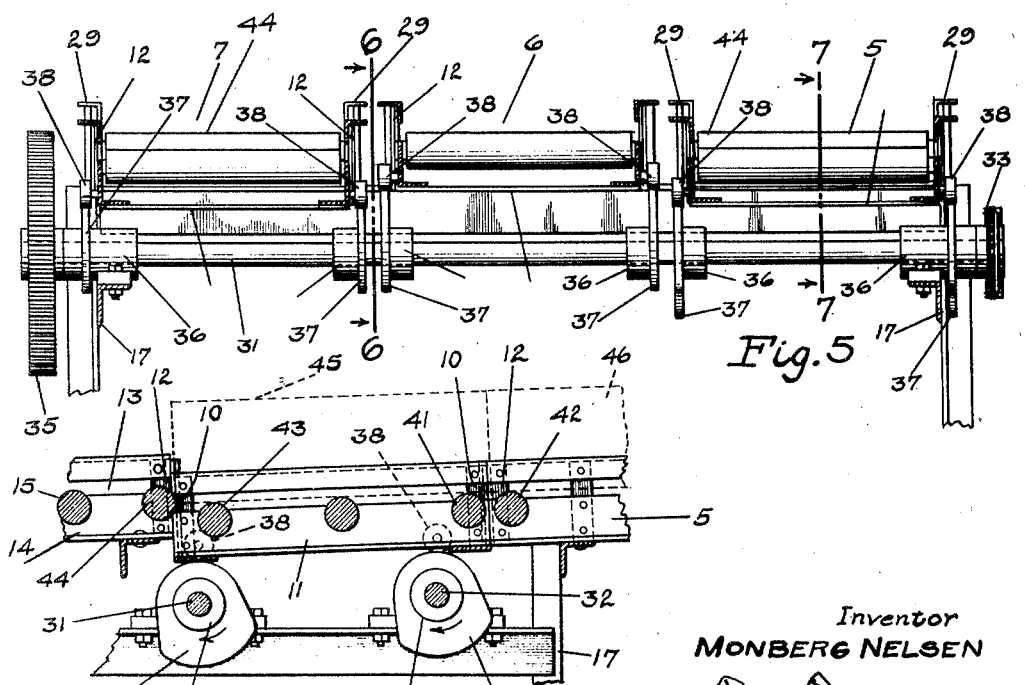
Fig. 5
Fig. 7
Inventor
MONBERG NELSEN
Attorneys April 14, 1931.  M. NELSEN  1,800,898
CONVEYING APPARATUS
Filed June 8, 1928    5 Sheets-Sheet 4

Inventor
MONBERG NELSEN
Attorneys

April 14, 1931. M. NELSEN 1,800,898
CONVEYING APPARATUS
Filed June 8, 1928 5 Sheets-Sheet 5

Inventor
MONBERG NELSEN
Attorneys

Patented Apr. 14, 1931

1,800,898

UNITED STATES PATENT OFFICE

MONBERG NELSEN, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYING APPARATUS

Application filed June 8, 1928. Serial No. 283,822.

This invention relates to improvements in conveying apparatus, and more particularly relates to an improved means or mechanism for successively directing articles or packages from a plurality of delivery conveyers onto a main line conveyer, whereby articles will automatically travel from the delivery conveyers onto the main line conveyer leading, as for example, to a storage house, or other destination, where it is desired to convey the articles.

An object of the invention is to provide a conveying apparatus comprising a main line conveyer having a plurality of delivery conveyers connected therewith by means of a trunk conveyer, and each delivery conveyer having means associated therewith for temporarily interrupting the delivery of articles therefrom onto the trunk conveyer, and to automatically control the delivery of the articles from said delivery conveyers onto the trunk conveyer in a manner to prevent congestion or blocking of the articles or packages at the receiving end of the main line conveyer.

A further object of the invention is to provide a conveying apparatus comprising a trunk conveyer, preferably power driven, having one end connected with a main line conveyer and its opposite end being comparatively wider and connected with a plurality of delivery conveyers, arranged on the same horizontal plane, and each delivery conveyer having a vertically movable section located adjacent to the trunk conveyer and adapted to control the discharge of articles from the delivery conveyers onto the trunk conveyer.

A further object is to provide a conveying apparatus comprising a power driven trunk conveyer having one end connected with a main line conveyer and having its opposite end diverging outwardly and connected with a plurality of delivery conveyers, each having a vertically movable section comprising a plurality of gravity rollers, said movable conveyer sections, when in elevated positions, preventing articles from being discharged from the delivery conveyers onto the trunk conveyer, and when in lowered or depressed positions, each movable section is adapted to receive an article from its complementary delivery conveyer and to discharge such article onto the trunk conveyer, when the loaded movable conveyer section is elevated, after which the article will travel over the trunk conveyer and be delivered to the main line conveyer, the movable conveyer sections being adapted for successive operation to successively discharge articles onto the trunk conveyer.

Other objects of the invention reside in the means provided for automatically actuating the movable conveyer sections to successively deliver articles from the delivery conveyers onto the trunk conveyer, from which the articles are delivered onto the main line conveyer in spaced relation; the cam mechanism provided for actuating the movable sections; the construction of the movable sections which is such that the anti-friction conveyer roller at the receiving end of each movable section will engage and prevent the next following articles from being delivered onto their respective movable sections; in the construction of the trunk conveyer which is such as to cause articles delivered thereonto from any one of the delivery conveyers connected therewith, to be delivered onto the main line conveyer connected with the opposite end thereof; in the means provided for manually controlling the discharge of articles from the delivery conveyers onto the trunk conveyer; and, in the general construction of the apparatus as a whole.

Other objects of the invention will appear from the following description and accompanying drawings and will be pointed out in the annexed claim.

In the accompanying drawings, there has been disclosed a structure designed to carry out the various objects of the invention, but it is to be understood that the invention is not confined to the exact features shown as various changes may be made within the scope of the claim which follows.

In the accompanying drawings forming part of this specification:

Figure 1 is a diagrammatic plan view, showing the improved conveying apparatus and the relative position of the trunk conveyer between the delivery conveyers and the main line conveyer;

Figure 2 is a side elevation of the trunk conveyer;

Figure 3 is a plan view of Figure 2, partially in section;

Figure 4 is an enlarged cross sectional view on the line 4—4 of Figure 3;

Figure 5 is a similar view on the line 5—5 of Figure 3;

Figure 6 is a detail sectional view on the line 6—6 of Figure 3, showing one of the movable conveyer sections in discharging position;

Figure 7 is a sectional view on the line 7—7 of Figure 3, showing one of the movable sections in position to receive an article from its complementary delivery conveyer;

Figure 8 is a perspective view, showing the guides for the movable sections;

Figure 9:
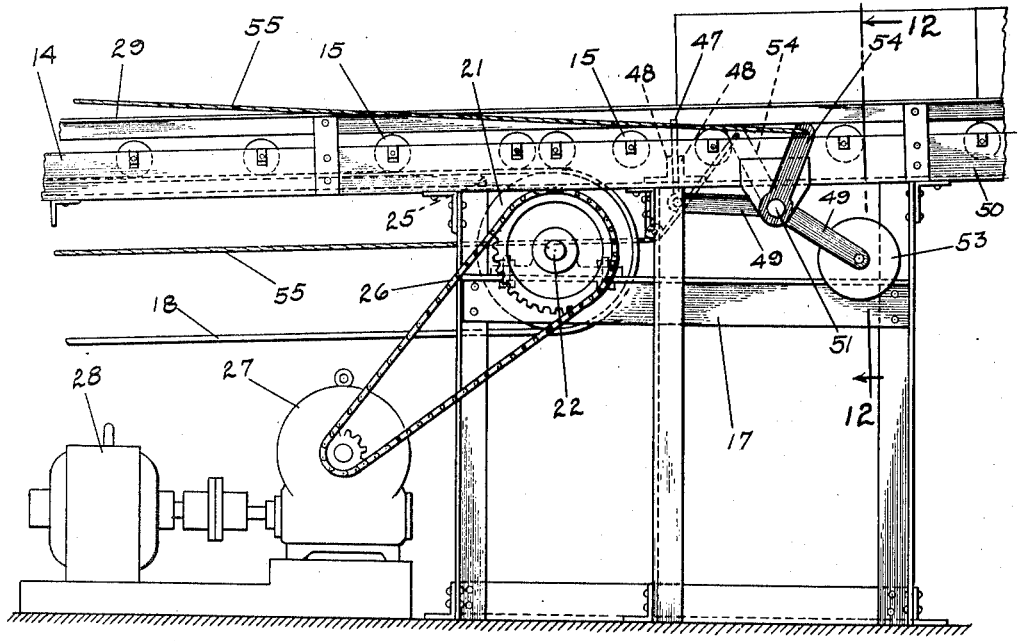
Figure 9 is an elevational view of a portion of the apparatus, showing a modified construction.
Figure 10:
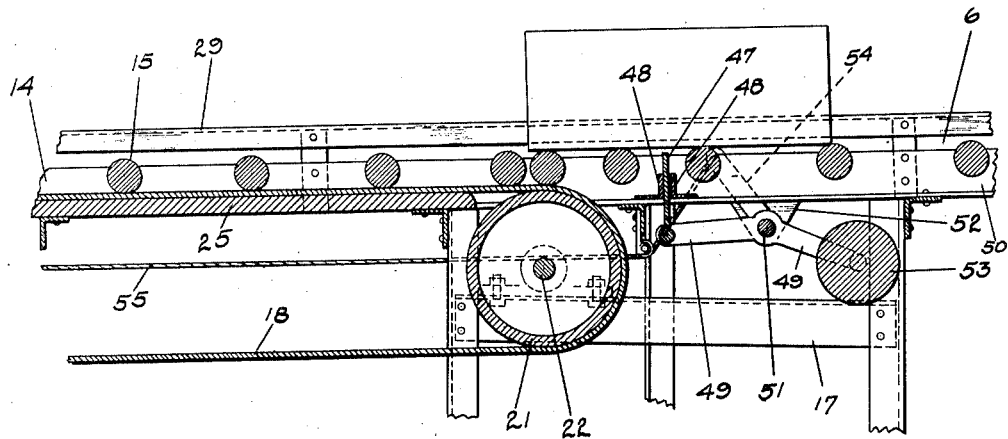
Figure 10 is a detail sectional view on the line 10—10 of Figure 11, showing the means provided for interrupting the discharge of articles from the delivery conveyers onto the trunk conveyer, when the apparatus is adapted for manual operation as shown in Figure 9.
Figure 11:
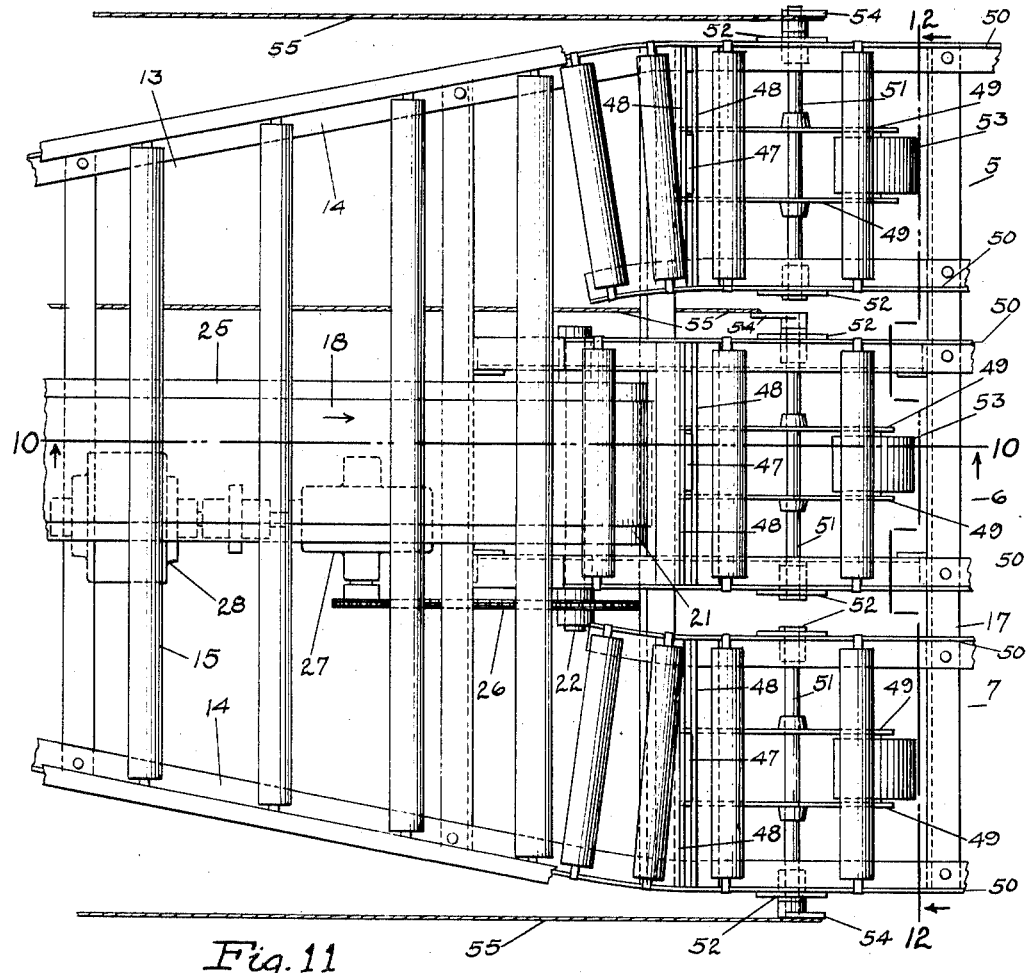
Figure 11 is a plan view of Figure 9.

In the selected embodiment of the invention here shown, for purposes of disclosure, there is illustrated in Figure 1, a plurality of receiving stations 2, 3, and 4, having suitable delivery conveyers 5, 6, and 7, respectively, for conveying articles therefrom to a main line conveyer 8, leading to a desired destination such, for example, as a warehouse 9, or other suitable receiving point.

The discharge ends of the delivery conveyers 5, 6, and 7, are preferably arranged on substantially the same horizontal plane, as indicated in Figure 2, and each has a movable conveyer section 11, connected therewith as shown in Figures 5, 6 and 7. Each conveyer section 11 is provided at each end with an upright flange 10, movable vertically in fixed guides 12, as shown in Figures 3 and 8. A trunk conveyer 13 has one end connected with the movable sections 11 and its opposite end connected with the main line conveyer 8, as shown in Figures 1 and 3. This trunk line conveyer comprises side rails 14, having a plurality of anti-friction rollers 15 journaled therein, as shown. The discharge end of the trunk conveyer 13 is supported upon a suitable frame 16, and its opposite end is supported upon a frame 17, shown in Figure 2. The rollers 15 of the trunk conveyer are preferably power driven by means of a belt 18, mounted upon pulleys 19 and 21, the latter pulley being secured to a shaft 22 journaled in the frame 17. The pulley 19 is mounted upon a shaft 23, supported in bearings 24 which are adjustably mounted upon the frame 16 by means of adjusting screws 20. These adjusting screws provide means for taking up slack in the belt 18. The upper run of the belt 18 is supported upon a suitable plate 25 shown in Figures 3, 4, and 6. The rollers 15 are mounted for vertical movement in the side rails 14 of the conveyer section 13 so that they will frictionally engage the upper run of the belt 18, as shown particularly in Figures 4 and 6. Thus, it will be seen that when an article or a load is discharged onto the trunk conveyer 13, the weight of the load will be carried by the plate 25, because of the rollers 15 riding thereon.

In the present instance, the shaft 22 is shown operated by a chain-and-sprocket drive 26, connecting it with a reduction gear mechanism 27, operatively connected to a motor 28, best shown in Figure 2. The trunk conveyer 13 is provided upon opposite sides with guide rails 29 which diverge from the main conveyer 8, to the outer rails of the delivery conveyers 5 and 7, as shown in Figure 3. The guide rails 29 function to guide the articles discharged onto the trunk conveyer from the conveyers 5 and 7, inwardly to the main line conveyer 8, as clearly indicated in Figure 1.

The means provided for vertically actuating the movable conveyer sections 11 of the delivery conveyers 5, 6, and 7, is shown in Figures 3, 5, 6, and 7, and comprises shafts 31 and 32, operatively connected together for simultaneous operation by means of a chain drive 33, shown in Figure 3. One end of the shaft 31 is operatively connected with the shaft 22 by means of a pinion 34 and gear 35. The shafts 31 and 32, preferably extend the full width of the three delivery conveyers, as shown in Figure 5, and are journaled in suitable bearings 36, provided upon the frame 17.

A plurality of cams 37 are mounted upon each shaft 31 32, and upon these cams, the movable conveyer sections 11 are supported by means of anti-friction rollers 38 rotatably mounted upon the conveyer sections 11. These rollers peripherally engage the cams 37, as shown in Figure 6. A group of four cams is used for each conveyer section 11 and the cams for each section are similarly arranged upon the shafts 31 and 32, so that each section 11 will be moved upwardly and downwardly in the guides 12, when the shafts are rotated. When three delivery conveyers are employed, as shown in the drawings, obviously, three groups of cams will be used, and these are preferably arranged as shown in Figure 6 so that the movable conveyer sections 11 will be successively actuated, whereby articles will be discharged onto the trunk conveyer 13 in spaced relation, thereby positively preventing jamming of the articles upon the trunk conveyer 13 and main line conveyer 8, as clearly shown in Figure 1.

When one of the conveyer sections 11 is in the position shown in Figure 7, it will be noted that the roller 41, at the receiving end of the same section, will be substantially in alinement with the roller 42 at the discharge end of its complementary delivery conveyer. In this figure, it will also be noted that the roller 43 at the opposite end of the conveyer section 11 will be positioned below the roller 44 of the trunk conveyer 13, thereby causing the forward end of the article or package 45, indicated by dotted lines in Figure 7, to engage the roller 44 and thus prevent the article from being discharged onto the trunk conveyer 13. When the conveyer section 11 is elevated from the position shown in Figure 7 to that shown in Figure 6, the article 45 will be discharged from the conveyer section 11 onto the trunk conveyer, and the next following article 46 will be prevented from being discharged onto the section 11 because of the roller 41 engaging the forward end thereof, thereby interrupting forward movement of the article 46. As soon, however, as the conveyer section 11 returns to its normal depressed position, shown in Figure 7, the next following article 46 will be delivered onto the conveyer section 11, as indicated in Figure 7.

The operation of discharging articles from the delivery conveyers 5, 6, and 7 onto the trunk conveyer 13 is, therefore, automatic, and only one article can be discharged onto the trunk conveyer at a time, unless the apparatus is arranged for handling articles or packages in groups, thereby positively preventing jamming or congestion of the articles at the restricted discharge end of the trunk conveyer 13.

Figures 9, 10, 11, and 12 illustrate a modified form wherein the discharge of the articles or packages from the delivery conveyers 5, 6, and 7, onto the trunk conveyer 13, is manually controlled. In the form here shown, the vertically movable sections 11, shown in the previous figures, are dispensed with and the discharge ends of the delivery conveyers 5, 6, and 7 terminate adjacent to the conveyer section 13, and the top portions of the conveyer rollers of the delivery conveyers 5, 6, and 7 are located in substantially the same plane as the rollers 15 of the trunk conveyer 13. (See Figure 10.) The means provided for controlling the discharge of articles or packages from the delivery conveyers onto the trunk conveyer 13 consists of a stop plate or member 47, mounted for vertical movement between a pair of guide angles 48, and located adjacent to the trunk conveyer. Each delivery conveyer is provided with such a stop member and as the stop member and associated parts are of similar construction, but one will be described.

Figure 12:
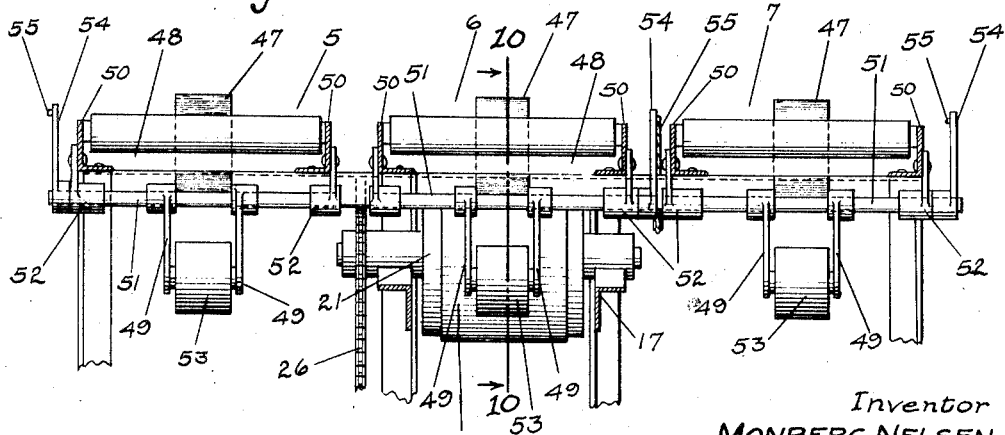
Figure 12 is a cross sectional view on the line 12—12 of Figure 11.

Each stop member 47 has its lower end pivotally connected to a pair of arms 49, secured to a rock shaft 51 journaled in suitable bearings 52 secured to the side rails 50 of the delivery conveyers 5, 6, and 7. A weight 53 is mounted between the opposite ends of each pair of arms 49, and normally tends to move the stop member 47 upwardly above the upper surfaces of the conveyer rollers and into the path of the approaching articles or packages, as shown in Figures 9 and 12. Each shaft 51 has an arm 54 terminally secured thereto, to which one end of a cable 55 is secured. The opposite ends of the cables 55 preferably lead to a control station, preferably located adjacent to the main line conveyer 8, whereby an operator, stationed at this point, may conveniently and selectively control the discharge of packages from the delivery conveyers 5, 6, and 7, onto the trunk conveyer 13, and therefore onto the main line conveyer 8.

This control station is not shown in the drawings as obviously it may be located at any desired point, or, if desired, the cables 55 may be dispensed with and suitable control levers provided adjacent to the stop members 47, whereby an operator stationed at this point may, in like manner, selectively control the discharge of articles from the delivery conveyers onto the trunk conveyer 13. The stop members 47, in this instance, are adapted for independent operation and, when in normal position, will be positioned as shown in Figure 12, wherein it will be noted that their upper ends project above the upper surfaces of the conveyer rollers into the path of the oncoming articles or packages.

The operation of the structure shown in Figures 9 to 12, inclusive, therefore, is similar to that shown in the previous figures, with the exception that the discharge of articles from the delivery conveyers onto the conveyer 13, is manually controlled. The structure shown in Figures 1 to 8, inclusive, is adapted for automatic operation, and, after the cams 37 have been properly adjusted upon the shafts 31 and 32, will automatically successively discharge articles from the delivery conveyers 5, 6, and 7, onto the trunk conveyer 13, causing the articles delivered to the main line conveyer 8 to be uniformly spaced apart, assuming, of course, that the supply of articles to the movable conveyer sections 11 is such as to cause an article to be discharged onto the trunk conveyer 13, each time one of the movable conveyer sections 11 is actuated.

The overall length of each movable section 11 should preferably be no longer than the length of the shortest package to be conveyed over the apparatus. If desired, however, each conveyer section may be made sufficiently long to receive two or more articles or packages so that each time a conveyer section 11 is actuated, it will deliver a group of two or more articles onto the trunk conveyer 13. Because of the rollers 41 on the movable sections 11, and the roller 44 on the trunk conveyer 13, being adapted to be engaged by the articles or packages, as above described, the packages will be fed onto the trunk conveyer from the delivery conveyers, one at a time, while succeeding packages are temporarily retained, as indicated at the right hand side of Figure 6, the lower corner of the article or package 46, engaging the roller 41 of the section 11, as shown.

The discharge of articles from the delivery conveyers 5, 6, and 7, onto the trunk conveyer 13, may be varied by changing the relative positions of the groups of cams upon the shafts 31 and 32, and also by varying the shapes of the cams in each group with respect to the shapes of the cams of another group, and, also by changing the speed ratio. The movable conveyer sections 11 may be arranged and operated in such a manner as to cause one conveyer section 11 to deliver one article onto the trunk conveyer, each time it is actuated, while another section 11 may deliver two articles at a time, and a third section may deliver three articles each time it is actuated. Thus, the apparatus may be varied to meet the requirements of different installations. In the drawings, I have shown but three delivery conveyers connected with the trunk conveyer 13. Obviously, the number of delivery conveyers employed may be varied without departing from the scope of the invention.

When the conveying apparatus is adapted for handling heavy articles, the cams 37 adjacent to the receiving ends of the movable sections 11, may be of the grooved type, so as to positively move the receiving end of each movable section downwardly, after a section has been elevated to discharge an article onto the trunk conveyer 13. In ordinary practice, however, I have found it unnecessary to provide grooved cams, as the weight of the sections 11 is usually sufficient to return them to their normal positions, regardless of the pressure exerted against the ends thereof, resulting from the next following article 46 engaging the roller 41.

In the drawings, I have shown the trunk conveyer used in connection with gravity conveyers, but it is to be understood that the mechanism may be used in connection with various types of conveyers, the features of the invention residing not in the constructional details of the conveyers, but in the means provided for controlling the discharge of articles from a plurality of delivery or other conveyers onto a main line conveyer. If desired, the trunk conveyer 13 may be rectangular in form so that the conveyer rollers 15 thereof may be of uniform length, but if the conveyer is so constructed, the guide rails 29 must be arranged in substantially the same manner as now shown in Figure 3, so as to guide the articles inwardly towards the main line conveyer 8.

I claim as my invention:

A conveying apparatus comprising a main line conveyer and a plurality of delivery conveyers, a trunk conveyer interposed between said main line and said delivery conveyers and adapted to receive and direct articles from the delivery conveyers to the main line conveyer, a vertically movable conveyer section at the discharge end of each delivery conveyer, a tongue-and-groove guide mechanism for said movable sections, spaced shafts beneath said movable sections having cams engaged with anti-friction means on said movable conveyer sections, and means for operating said shafts to cause said sections to be vertically translated, whereby articles on said delivery conveyers will be successively discharged onto said trunk conveyer and be directed to said main line conveyer.

In witness whereof, I have hereunto set my hand this thirty-first day of May, 1928.

MONBERG NELSEN.